US007231612B1

(12) United States Patent
Mani et al.

(10) Patent No.: US 7,231,612 B1
(45) Date of Patent: Jun. 12, 2007

(54) COMPUTER-EXECUTABLE METHOD FOR IMPROVING UNDERSTANDING OF BUSINESS DATA BY INTERACTIVE RULE MANIPULATION

(75) Inventors: Denkanikota R. Mani, Boxborough, MA (US); Brij M. Masand, Wayland, MA (US)

(73) Assignee: Verizon Laboratories Inc., Waltham, MA (US)

( * ) Notice: Subject to any disclaimer, the term of this patent is extended or adjusted under 35 U.S.C. 154(b) by 527 days.

(21) Appl. No.: 10/371,604

(22) Filed: Feb. 21, 2003

Related U.S. Application Data

(62) Division of application No. 09/441,286, filed on Nov. 16, 1999, now Pat. No. 6,677,963.

(51) Int. Cl.
  G06F 3/048 (2006.01)
  G06F 17/30 (2006.01)
  G06F 19/00 (2006.01)
(52) U.S. Cl. ............... 715/841; 715/968; 715/962; 707/5; 707/2; 706/60; 706/47; 705/10
(58) Field of Classification Search ............ 715/841, 715/968, 962, 781, 764, 810; 705/7, 10, 705/38; 707/104.1, 24, 5; 706/60, 46, 47, 706/59
See application file for complete search history.

(56) References Cited

U.S. PATENT DOCUMENTS

| 5,615,341 | A | * | 3/1997 | Agrawal et al. | ............... 705/10 |
| 5,724,573 | A | | 3/1998 | Agrawal et al. | ............ 395/606 |
| 5,794,209 | A | * | 8/1998 | Agrawal et al. | ............ 707/5 X |
| 5,819,255 | A | | 10/1998 | Celis et al. | ..................... 707/2 |
| 5,842,200 | A | * | 11/1998 | Agrawal et al. | ............ 707/3 X |
| 5,920,855 | A | | 7/1999 | Aggarwal et al. | ............. 707/3 |

(Continued)

OTHER PUBLICATIONS

S. Chadhuri et al., OLAP and Data Warehousing, Workshop Notes from 3rd Intl. Conference on Knowledge Discovery and Data Mining, Newport Beach, CA (Aug. 14, 1997).
Daniel Keim, Visual Techniques for Exploring Databases, Workshop Notes from 3rd Intl. Conference on Knowledge Discovery and Data Mining, Newport Beach, CA (Aug. 14, 1997).

(Continued)

Primary Examiner—Raymond J. Bayerl

(57) ABSTRACT

Methods and systems operating in accordance with the present invention provide an interactive directed data analysis tool. The tool provides a user interface that receives a model from a data mining system. The tool computes specified business metrics representing business measures of quality reflected by the model. The model parameters may be manipulated by a user. Each time parameters of a model change, the business metrics are re-computed, thereby promoting directed data understanding by allowing a user to immediately see the impact of any changes made.

10 Claims, 6 Drawing Sheets

U.S. PATENT DOCUMENTS

| | | |
|---|---|---|
| 6,014,661 A | 1/2000 | Ahlberg et al. ............... 707/3 |
| 6,108,648 A | 8/2000 | Lakshmi et al. ............... 707/2 |
| 6,182,070 B1 * | 1/2001 | Megiddo et al. ............ 707/2 X |
| 6,321,205 B1 * | 11/2001 | Eder ............................ 705/7 |
| 6,321,217 B1 | 11/2001 | Maeda et al. ................ 706/47 |
| 6,405,173 B1 * | 6/2002 | Honarvar et al. ............. 705/7 |
| 6,411,936 B1 * | 6/2002 | Sanders ...................... 705/10 |
| 6,510,427 B1 * | 1/2003 | Bossemeyer et al. ......... 707/6 |

OTHER PUBLICATIONS

J. Ross Quinlan, C4.5: Programs for Machine Learning, 1993, pp. 1-107.

Advances in Knowledge Discovery and Data Mining, ed. Usama M. Fayyad, Gregory Piatetsky-Shapiro, Padhraic Smyth, and Ramasamy Uthurusamy, The MIT Press, 1996, pp. 1-34.

Advances in Knowledge Discovery and Data Mining, ed. Usama M. Fayyad, Gregory Piatetsky-Shapiro, Padhraic Smyth, and Ramasamy Uthurusamy, The MIT Press, 1996, pp. 37-57.

* cited by examiner

Fig. 1 - Prior Art

COMPUTER-EXECUTABLE METHOD FOR IMPROVING UNDERSTANDING OF BUSINESS DATA BY INTERACTIVE RULE MANIPULATION

This application is a divisional of application Ser. No. 09/441,286, filed Nov. 16, 1999, now U.S. Pat. No. 6,677,963.

FIELD OF THE INVENTION

This invention relates generally to data processing systems and, more particularly, to a system and method for improving understanding of business data by interactive rule manipulation.

BACKGROUND OF THE INVENTION

From a business perspective, the term "knowledge discovery" refers to an iterative process approach to modeling and exploring data, and gaining knowledge therefrom for integration into a business process. FIG. 1 depicts an exemplary representation of the knowledge discovery process. First, a general business problem is identified (step 105). The problem is typically framed within a particular business context to formulate a clear and well-understood problem definition (item 110). Once the problem has been explicitly defined, data relevant to the problem, or reflective of the problem, is collected, assembled, and preprocessed (step 120), usually from one or more existing databases (item 115). This data is then preprocessed to a suitable form to produce a dataset (item 125). The dataset is processed by a data mining technique (step 130) and translated into a model (item 135) that abstracts systematic patterns in the underlying data. Model interpretation and evaluation (step 140) is aimed at extracting nuggets of knowledge (item 145) for exploitation and use in a business, and ultimate integration into a business process (step 150).

Building a model from raw data (step 130 above) may be done through a variety of data mining techniques. The term "data mining" refers to an automated process of discovering systematic patterns in large amounts of data. A data mining algorithm is thus used to model data by detecting and generalizing patterns in historical data, so that the model can be applied to new scenarios (or combinations) not directly covered, or observed in, the data. Continuing with the exemplary representation of knowledge discovery in FIG. 1, the results of model evaluation and interpretation (step 140) and business process integration (step 150) may provide additional feedback into other steps in subsequent iterations of the knowledge discovery process, including problem identification (step 105), data assembly and preprocessing (step 120) and data mining (step 130). Further information on a prior art knowledge discovery process is included in "Advances in Knowledge Discovery and Data Mining," by Usama M. Fayyad et al., AAAI Press/MIT Press, Cambridge, Mass. (1996), incorporated herein by reference.

"Predictive data mining" refers to the use of data mining techniques for building predictive models. Predictive models are learned from historical (ore pre-classified) data using data mining algorithms. These models can then predict the quality or attribute of interest for new and unseen cases. For example, a predictive model, learned from prior known cases of credit (un)worthiness, can be used to predict the credit worthiness (or otherwise) of a new customer. Predictive data mining models are quantitative and compute objective results: "yes" or "no", a probability, a value, a classification, etc. Examples of predictive data mining techniques include neural networks, statistical regression, decision trees, decision rules, etc. Qualitative data mining techniques, on the other hand, generally provide insight into relationships among data and provide more subjective results.

The knowledge discovery process depicted in FIG. 1 fails to explicitly include one crucial component, required for a successful knowledge discovery process in a business context-domain knowledge. "Domain knowledge" includes knowledge about a business, business processes, and "common sense" knowledge pertaining to a problem being investigated. Domain knowledge comes into play in various tasks of an iterative knowledge discovery process, including circumscribing the business problem, selecting and using appropriate data, and evaluating models (or patterns) generated by data mining algorithms.

In the prior art, techniques for qualitative data mining include exploratory data analysis, data visualization, data base reports and on-line analytical processing (OLAP). Exploratory data analysis uses a variety of statistical techniques to explore raw data. "Exploratory Data Analysis," by J. W. Tukey, Addition Wesley (1977), incorporated herein by reference, describes several of these techniques. Data visualization techniques display data in graphs, charts, and other visual constructs. Database reports and OLAP usually provide canned views of data for specific applications and to highlight particular pieces of information. "OLAP and Data Warehousing," Workshop Notes from the Third International Conference on Knowledge Discovery and Data Mining, by S. Chaudhuri and U. Dayal (1997), incorporated herein by reference, provides an overview of techniques and references to OLAP literature. "Visual Techniques for Exploring Databases," from the Third International Conference on Knowledge Discovery and Data Mining, by D. Keim (1997), incorporated herein by reference, provides an overview of techniques and references to visualization literature. All of these techniques, because they operate only on raw data, can be time consuming and cumbersome, are usually tailored to specific tasks, and place the entire burden of interpretation and understanding on the user. Further, they fail to provide a systematic way of representing, and taking into account, a particular business problem and context. Nor do they explicitly incorporate domain knowledge into the knowledge discovery process.

Thus, given the need for incorporating domain knowledge in a knowledge discovery endeavor, there exists a need for an interactive tool that supports qualitative data mining, and that will guide a user towards understanding and gaining insight and subsequent knowledge from data and promote an understanding of market dynamics from a specific business perspective, in a quick and efficient manner.

SUMMARY OF THE INVENTION

In accordance with a first aspect of the present invention, as embodied and broadly described herein, an interactive method is implemented in a data processing system for directed data analysis. The system receives rules, which represent relationships among elements of a dataset. The system then displays the rules and computes business measures of quality associated with the rules. A user may manipulate the rules by changing, adding, or deleting parameters.

In accordance with an embodiment of the first aspect of the present invention, as embodied and broadly described herein, an apparatus is provided that includes a memory, including model generation software system that translates a dataset into a model, and a model manipulation system that allows a user to manipulate the generated model. The system further includes an output device for displaying the generated model, an input device for receiving user manipulations of the generated model, and at least one processor for executing the model generation software and the model manipulation system.

Furthermore, in accordance with an embodiment of the first aspect of the present invention, as embodied and broadly described herein, a graphical user interface is provided that includes a market segmentation interface and a rule manipulation window. The graphical user interface further includes means for displaying a rule, and allowing a user to manipulate the displayed rule, where a manipulation of the displayed rule permits an analyst to perform directed data analysis.

DETAILED DESCRIPTION

Figure 1:
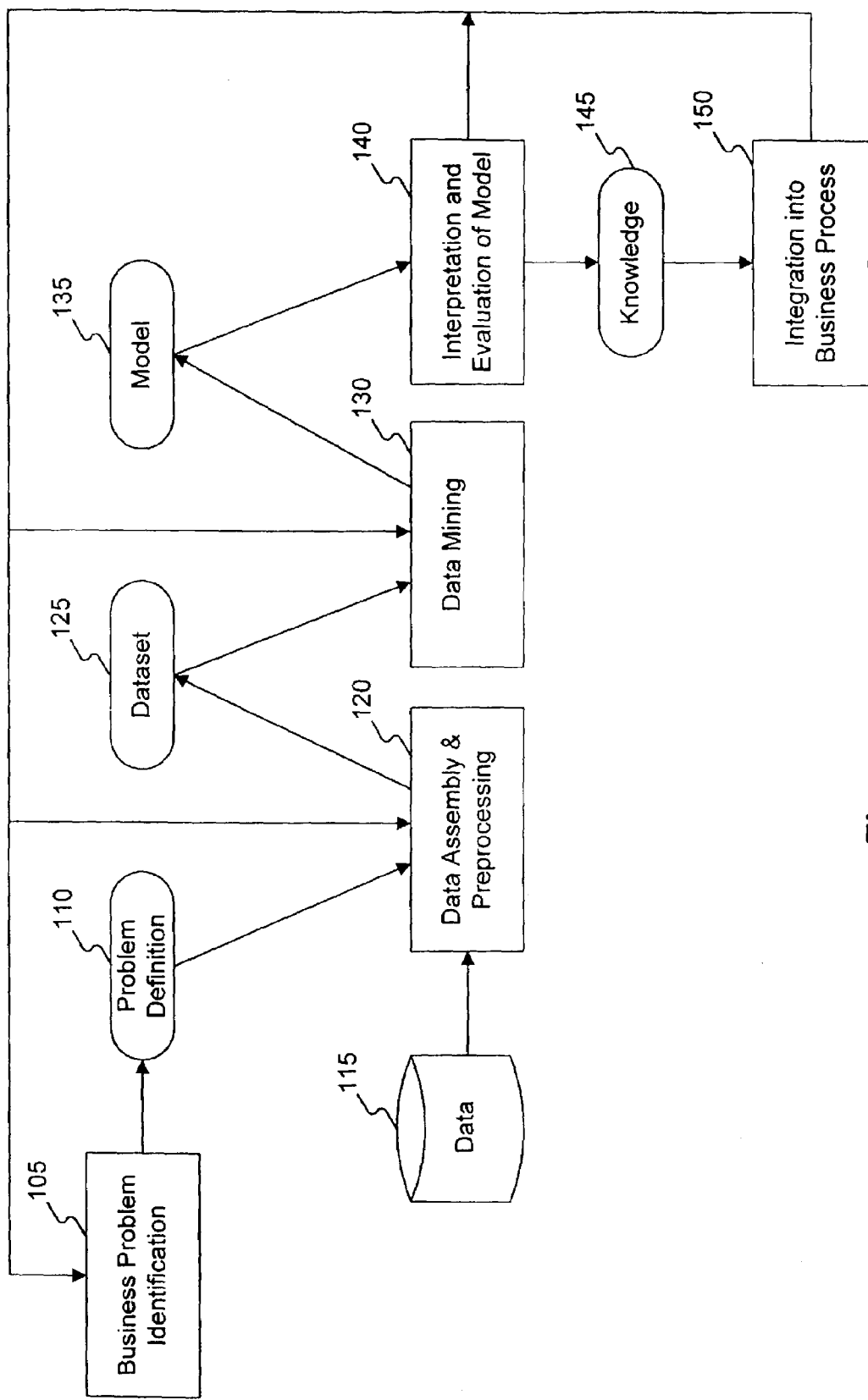
FIG. 1 depicts an exemplary representation of a prior art knowledge discovery process.

Reference will now be made in detail to an implementation consistent with the present invention as illustrated in the accompanying drawings. Wherever possible, the same reference numbers will be used throughout the drawings and the following description to refer to the same or like parts.

System Overview

Methods and systems operating in accordance with the present invention provide a tool for directed data analysis that explicitly harnesses a business analyst's domain knowledge, common sense, and business expertise to perform directed data analysis in a knowledge discovery process. The method enables better understanding of business data through an interactive rule manipulation approach to gaining understanding and insight into data, including, for example, discovering important segments in a population of data, or optimizing business payoff. More specifically, methods and systems operating in accordance with the present invention provide an interactive user interface that displays a concise, generalized representation of an original dataset in the form of a model, comprised of decision rules, reflective of the dataset. Via the user interface, a user may manipulate, i.e., add, change or delete, the decision rules to perform a qualitative analysis. A user may also use the interface to compute values reflecting measures of quality (described further below) of the decision rules. Herein, this system will be referred to as a "model manipulation system."

In the model manipulation system, a model in the form of decision rules is received from a data mining tool, such as, for example, a rule induction algorithm. Each time a user changes the model, the model manipulation system recomputes the measures of quality, thereby providing immediate feedback on the effect the changes had on the model. This interactive user manipulation process allows a user to manipulate a model to reflect domain knowledge and other information related to a relevant business problem or situation. Therefore, models generated within this process necessarily reflect a relevant business problem and incorporate business context. The term "user" as used throughout this document refers to any user of the model manipulation system, typically, a human business analyst.

Introduction

Business analysts generally look at data with a specific goal in mind, such as, for example, segmenting customers, designing a new campaign, or creating customer lists for existing campaigns. Thus, a knowledge discovery process performed in a context-specific manner, i.e., directed to understanding data in the context of a predictive modeling problem and yielding results that reflect insight and understanding of the data as applied to a particular application or in a particular context, such as, for example, a business goal, is extremely valuable. Such a process explicitly feeds into, and assists an analyst in understanding data in the context of a business problem. The term "directed data understanding" refers to the process of understanding data in the context of a predictive modeling problem. A related term, "directed data analysis," refers to a process for analyzing data in the context of a predictive modeling problem by directing data understanding in the context of the predictive modeling problem. The term "domain knowledge" refers to an analyst's knowledge about a business or business process, and common sense knowledge pertaining to the problem being investigated. Thus, a knowledge discovery process that integrates domain knowledge with directed data analysis yields directed data understanding, the ultimate goal of a knowledge discovery endeavor.

A human analyst's domain knowledge may be used to perform tasks such as circumscribing a business problem, selecting and using appropriate data, and evaluating models or patterns generated by data mining algorithms. Consistent with an implementation of the model manipulation system, a predictive model generated by a data mining technique serves as the starting point for an analyst's hypotheses. A model includes a set of decision rules and computed values indicating business measures of quality (discussed below relative to the discussion of FIG. 4), or business metrics. An analyst may manipulate the decision rules and initiate a recomputation of the business metric values. The analyst analyzes the rules and the computed business metric values to gain insight into the relationships among the data, thereby enhancing the level of understanding of the underlying business problem.

The model manipulation system offers several advantages to a user. For example, a user may look at the rules generated for each market and understand the factors contributing to customer loyalty in that market. By editing rules via the user interface, a user may explore "what-if" scenarios and gain insight into the driving factors for loyalty and explore market micro-segments tailored for the business problem at hand. Additionally, a user may explore and validate intuitions by selecting or creating rules that codify the analyst's intuitions about market behavior, and measuring the quality of those rules and their variants. Still further, a user may identify high quality rules whose antecedents contain meaningful and actionable conditions and use those rules to gain insight into market dynamics, and to design new campaigns for incorporation into a business process with an eye to achieving specific goals, including, for example, maximizing payoff. Similarly, a user may select or create rules whose antecedents match conditions of existing campaigns to explore and evaluate the campaigns.

Figure 2:
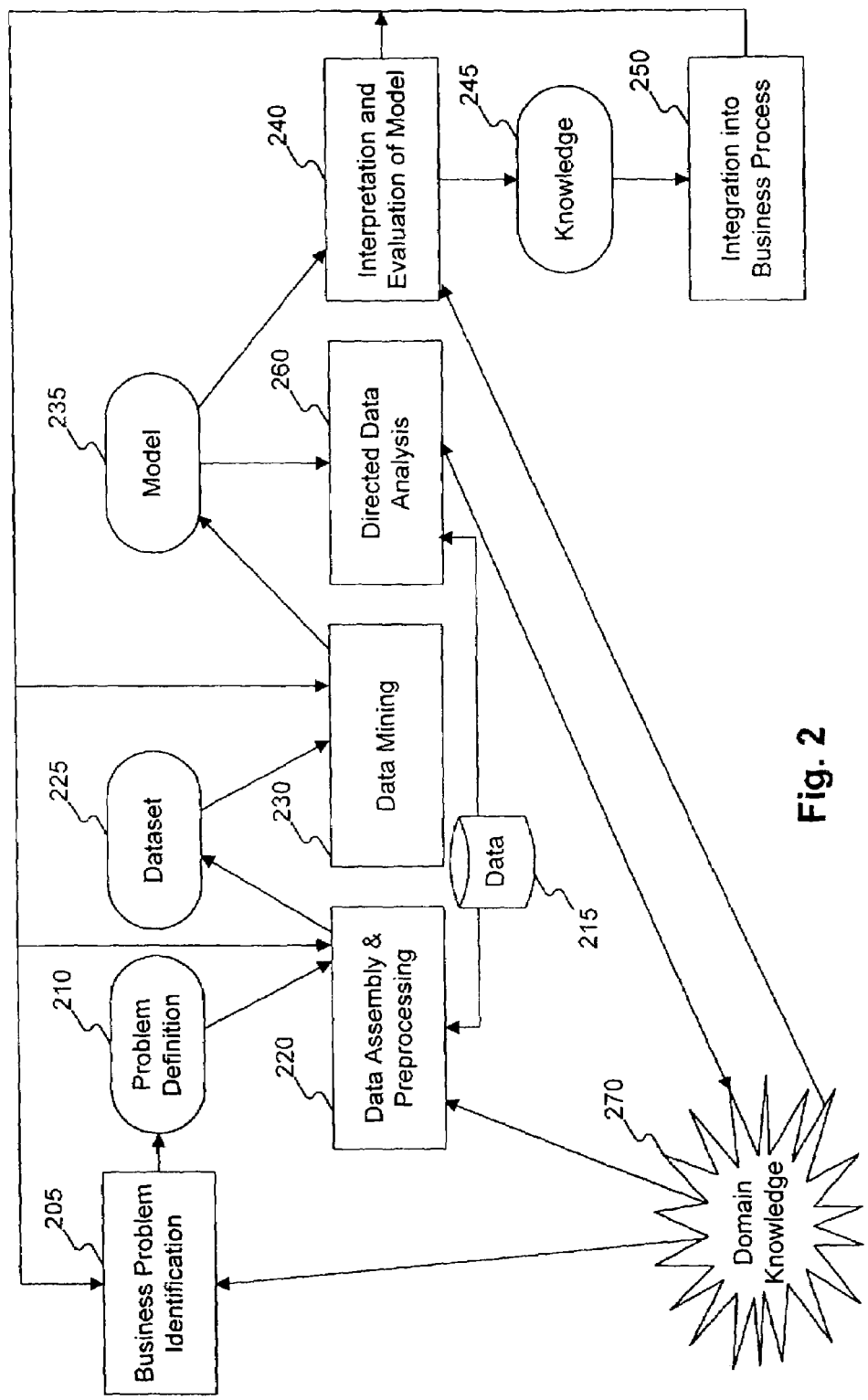
FIG. 2 depicts an exemplary representation of the knowledge discovery process of the present invention using directed data analysis.

FIG. 2 depicts an exemplary representation of the knowledge discovery process containing steps and items 205–250, paralleling steps and items 105–150 in FIG. 1, but includes directed data analysis (step 260), using an analyst's domain knowledge (step 270), as a new task. In directed data analysis, a model generated with a data mining technique provides an initial set of hypotheses. For example, a model including a set of decision rules may serve as an analyst's starting point. During directed data analysis (step 260), an analyst studies the model (i.e. the decision rules) and forms conclusions about the data represented by the model. For example, an analyst may look at data from various perspectives by changing, for example, values of specific data fields and comparing the results of received when looking at various views of data, thereby gaining knowledge about the data and its relationships.

Implementation Details

Figure 3:
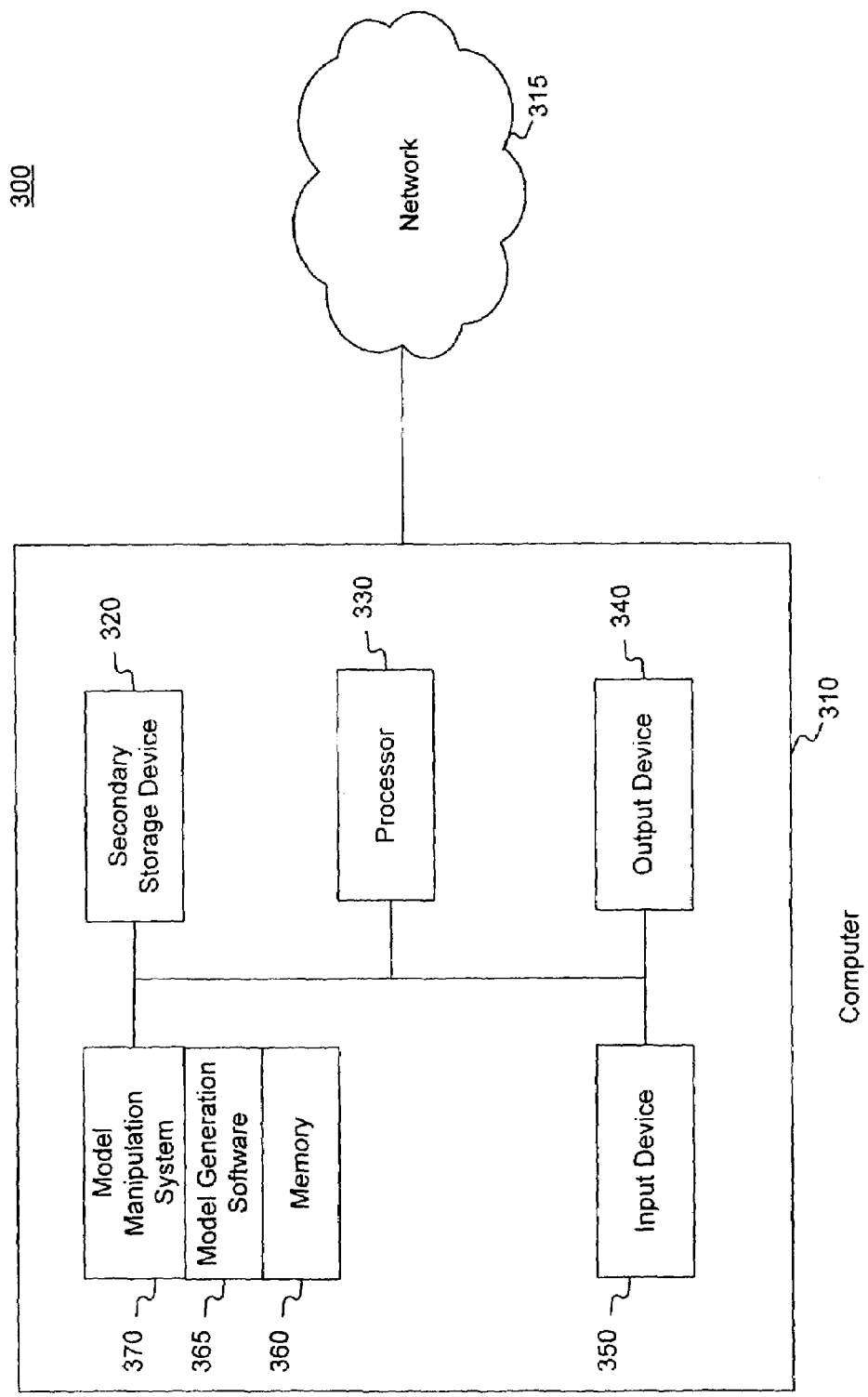
FIG. 3 depicts an exemplary representation of a computer system using the model manipulation system of the present invention.

FIG. 3 depicts an exemplary computer network 300 suitable for practicing methods and implementing systems consistent with the present invention. Computer network 300 includes computer 310 connected to network 315. Computer 310 includes a secondary storage device 320, a processor 330, an output device 340, an input device 350, and a memory 360. Memory 360 further includes model generation software 365 and model manipulation system 370. Model generation software 365 represents a data mining system used to develop and present a model to model manipulation system 370. For example, model generation software 365 may correspond to a decision tree or rule induction algorithm that outputs a model in the form of a series of decision rules.

Model manipulation system 370 represents a system operating in accordance with the principles of the present invention that allows a user to manipulate the parameters of a model provided by model generation software 365. More specifically, model manipulation system 370 is used to perform directed data analysis, step 260 of FIG. 2. Model manipulation system 370 interfaces model generation software 365 to receive a model. Model manipulation system 370 also includes a user interface, allowing a user to interact with the model received from model generation software 365.

One skilled in the art will appreciate that computer 310 and network 315, although depicted with various components, may contain additional or different components. For example, model generation software 365 may reside on another computer connected to network 315. One skilled in the art will also appreciate that in this exemplary embodiment, only one computer and one network are shown, although methods and systems consistent with the present invention may function with many computers, interconnected via many networks. Furthermore, although aspects of the present invention are described as being stored in memory, one skilled in the art will appreciate that these aspects can also be stored on or read from other types of computer-readable media, such as secondary storage devices, like hard disks, floppy disks, a CD ROM, or other forms of RAM or ROM.

Figure 4:
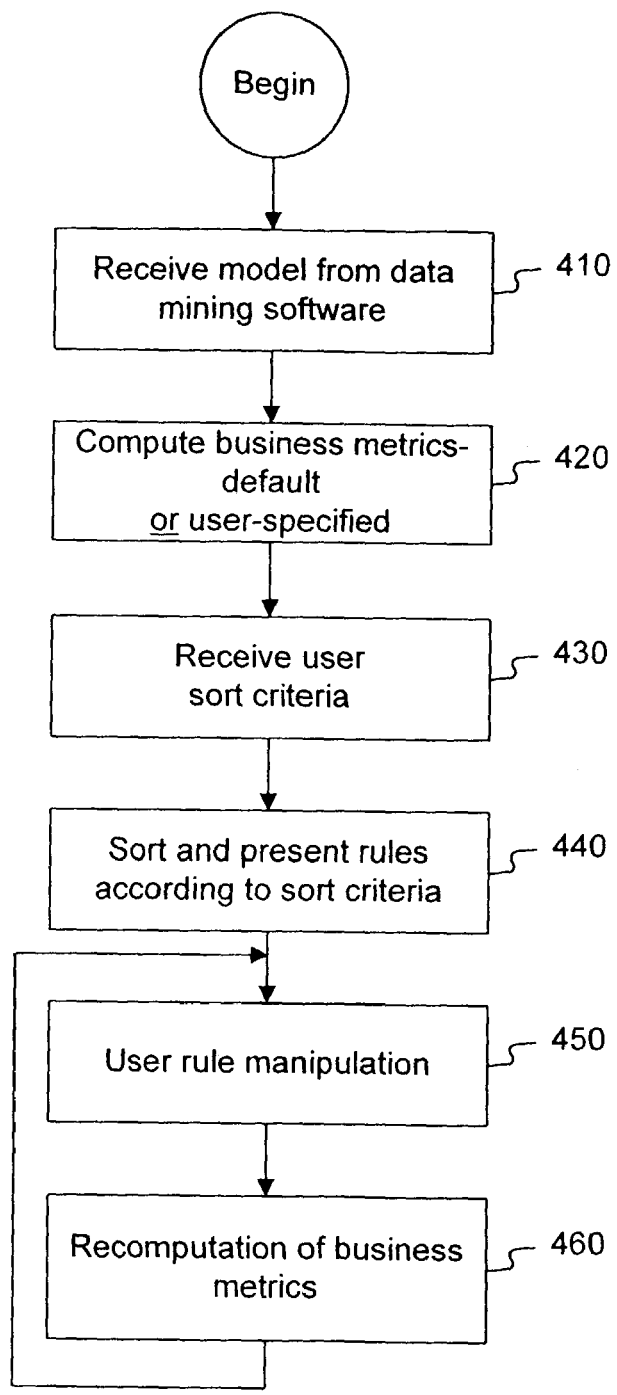
FIG. 4 depicts a flow chart of the steps performed by the model manipulation system of the present invention.

FIG. 4 depicts a flow chart of the steps performed by the model manipulation system. First, the model manipulation system receives a model from a model generation software system, such as, for example C5.0 by RuleQuest Research (step 410). C5.0 is a rule induction algorithm that receives a set of raw data and translates it into a model of decision rules. Further information on C5.0 may be found in "C4.5: Programs for Machine Learning," by Quinlan, J. Ross, Morgan Kaufmann (1993), incorporated herein by reference. The following discussion describes an implementation of the model manipulation system as applied to a set of decision rules.

The model manipulation system uses an iterative approach to generate a relatively large set of decision rules. A "decision rule," also referred to as a "rule," is presented to a user in the form of an "if-then" statement. For example,
If condition 1 and
condition 2 and
. . . and
condition n
then prediction with confidence.

If the conditions in the antecedent are true then the rule predicts that prediction will be true with some confidence. The confidence is an estimate of how accurate a rule is, based on the data.

To generate a large set of decision rules, the model manipulation system invokes a rule induction algorithm, or other data mining tool that outputs a set of decision rules, on the same set of data with different values of the model generation parameters, e.g., varying a pruning confidence level, a minimum number of cases in each branch, etc. When the model generation system is run on a dataset, a rule set is created. The model manipulation system combines rules from the various rule sets and eliminates duplicates.

Next, the model manipulation system computes specified business metrics for the rule set (step 420). The term "business metric" refers to values characterizing the quality of a rule in terms of the business performance of the rule. For example, a business metric to determine the size of a data population impacted by a particular rule may be computed. The model manipulation system computes a default set of business metrics. Alternatively, a user of the model manipulation system may specify the business metrics to be computed. Further details on the computation of business metrics are discussed below relative to the example of "churn" prediction.

Once the model manipulation system has computed the specified business metrics for a model, a user may indicate a desired sort order of the rules or the results of the business metric calculations (step 430). After receiving the user sort criteria, the model manipulation system sorts the model rules accordingly and presents the rules to a user via the user interface (step 440).

Figure 6:
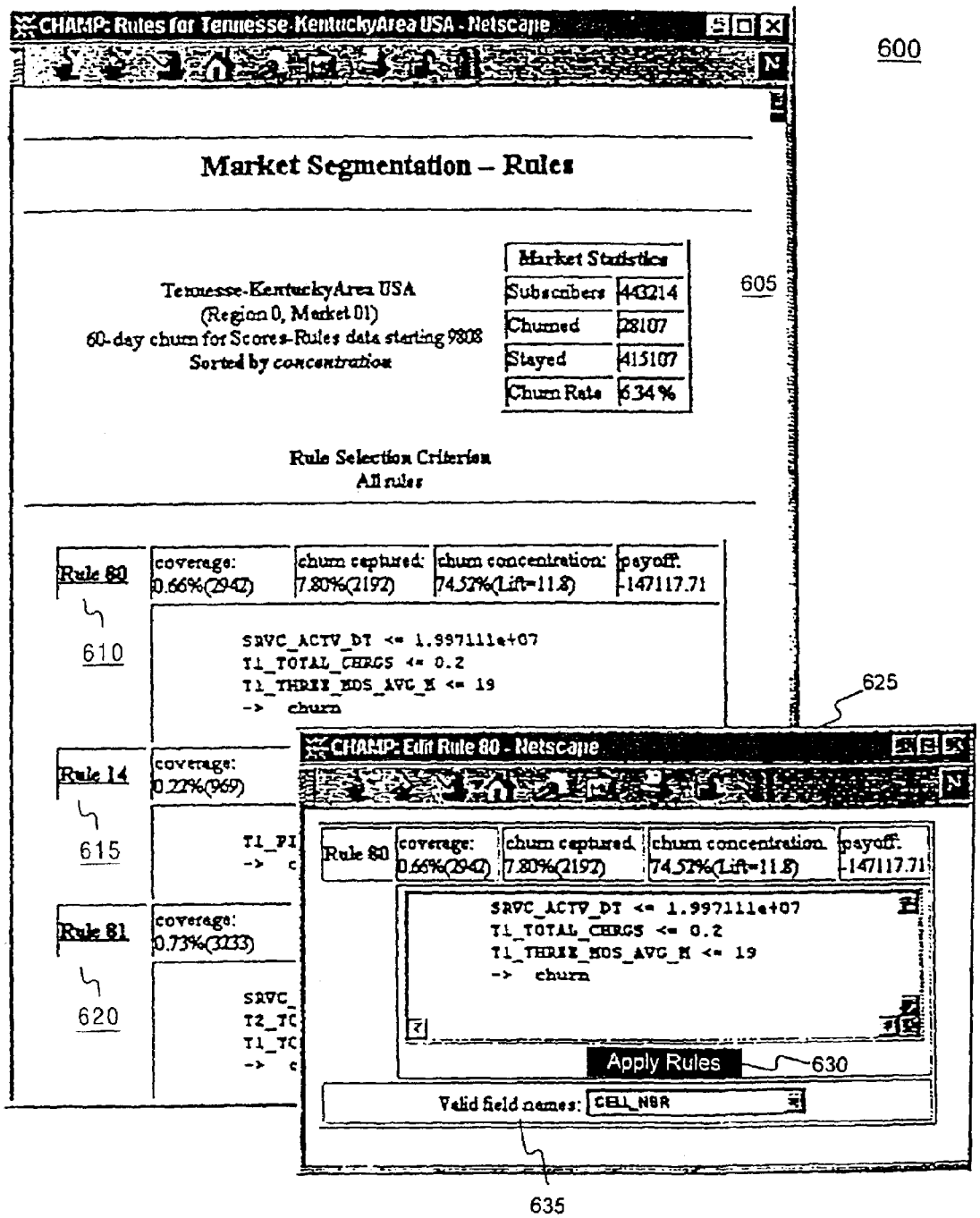
FIG. 6 depicts a screen shot of the rule display and rule edit windows of the model manipulation system of the present invention.

Next, a user may modify an individual rule in a rule set in any manner, including, changing, adding, or deleting existing conditions in the antecedent, or changing the prediction of the rule by using a rule edit window (step 450). Details of the rule edit window are discussed below relative to the discussion of FIG. 6. After a rule has been modified, the model manipulation system recomputes the rule quality measures for the modified rule (step 460). The rule manipulation and recomputation, steps 450 and 460, may be performed repeatedly, as directed by a user of the model manipulation system.

Figure 5:
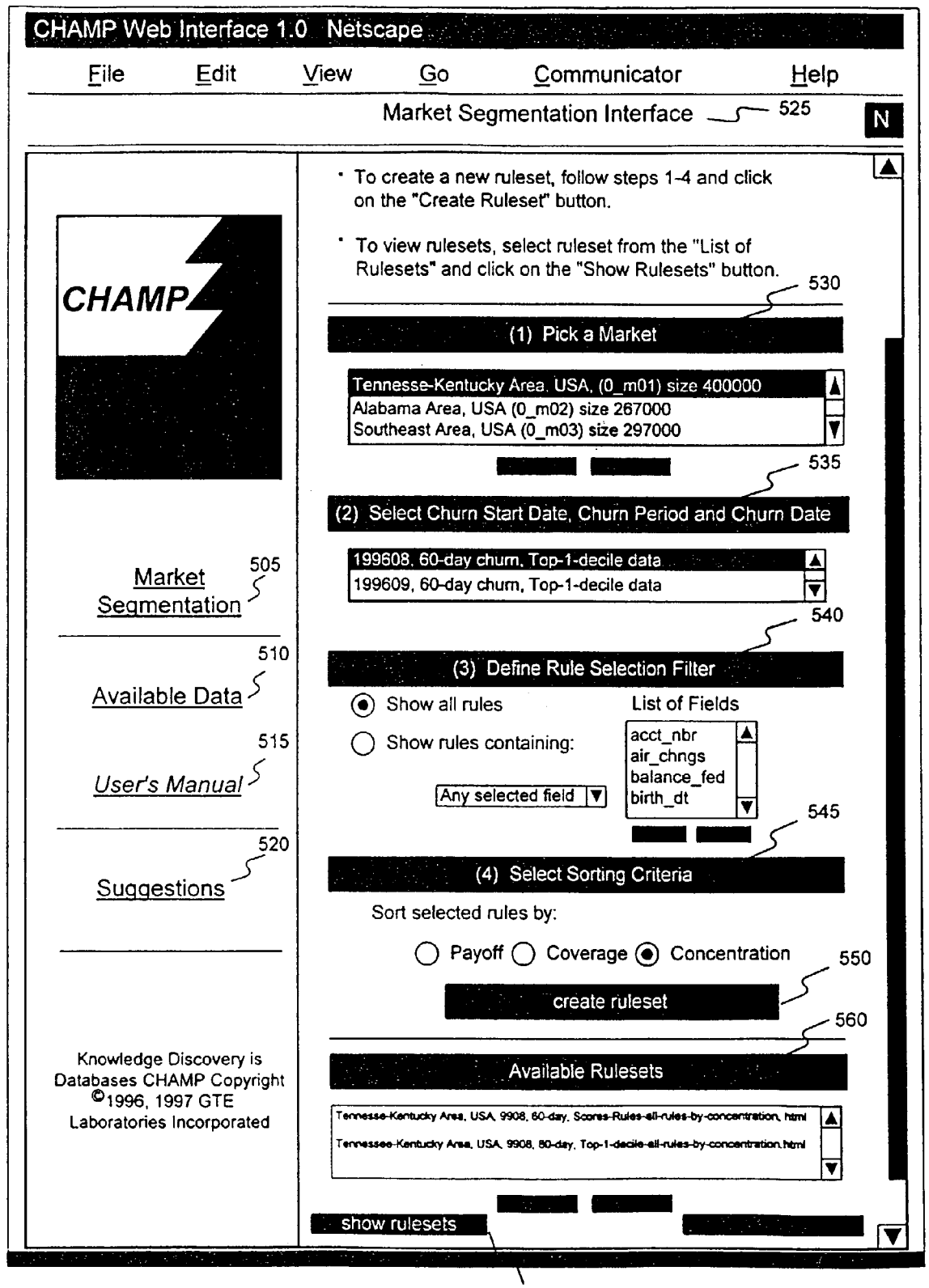
FIG. 5 depicts a screen shot of the user interface of the model manipulation system of the present invention.

FIG. 5 depicts a screen capture of the web-based graphical user interface of the model manipulation system. As discussed above relative to step 450, once model parameters have been generated and the rule quality measures have been computed, a user may manipulate the rules via the user interface, to perform directed data analysis. The left hand side of FIG. 5 corresponds to the entry screen. It includes hypertext links to the market segmentation function 505, available data 510, user's manual 515, and suggestions 520. By selecting the "available data" hypertext link 510, the model manipulation system displays the type and time frame for which data may be viewed, or incorporated into a model. By selecting the "user's manual" hypertext link 515, a user may view an on-line help system. By selecting the "suggestions" hyper text link 520, a user may provide feedback and suggestions for improving the system, report problems, etc.

By selecting market segmentation 505, a user gains access to the market segmentation interface 525 (displayed as the right hand side of FIG. 5). The market segmentation interface 525 allows a user to both create rule sets and view rule sets. To create a rule set, the user proceeds as follows. Using Selection 530, the user selects a particular market of interest. Choice of one or more markets in Selection 530 results in Selection 535 showing the time frames for which rule sets are available for the selected markets. Selection 535 enables the user to pick a date for which the user desires to view rules. Screen areas 540 and 545 allow the user to specify rule filtering and sorting criteria. Selection 540 allows a user to filter rules according to one or more fields, individually or collectively, occurring (or not occurring) in a rule. The created rule set would include only those rules that satisfy the filtering criteria. Screen area 545 allows a user to specify sorting criteria for the selected rules based on a rule quality measure, including payoff, concentration or coverage. Clicking on the "create ruleset" button 550 results in the creation of a rule set based on the selected criteria. The created rule set is added to the list of currently available rule sets 560.

The list of currently available rule sets is shown in screen area 560. A user may view one or more of these rule sets by highlighting the respective items and selecting "show rule(s) sets" 565. By selecting "show rule(s) sets" 565, the model manipulation system takes the user to the Market Segmentation screen 600, shown in FIG. 6, that allows a user to view and edit a selected rule set.

The top of the Market Segmentation screen 600 displays market statistics 605. Specifically, Market Statistics 605 displays the number of subscribers, the number of churners (the term "churn" is described below, relative to the discussion of Tables 1 and 2), the number of non-churners, and the churn rate for the population included in the dataset. The bottom portion of the Market Segmentation screen 600 displays all of the selected rules. Each of the rules 610, 615, and 620 is displayed as a hypertext link to rule edit window 625. Thus, by selecting one of the rule hypertext links rule edit window 625 is displayed, with details of the respective rule.

Rule edit window 625 allows a user to manipulate rules by adding, changing or deleting conditions and parameters. The top portion of rule edit window 625 displays the computed business metrics for the relevant rule. By selecting "Apply Rules" 630, the business metrics are recomputed and displayed for the user to view. While editing a rule, a user may desire to add new conditions to a rule. "Valid Field Names" 635 presents a selectable list of acceptable variable names and their meanings. A user may select variables from "Valid Field Names" 635 to add a new condition to an existing rule.

The following examples illustrate an application of directed data analysis, using a rule-based implementation of the model manipulation system, to a business problem of cellular churn prediction. "Churn" refers to an act of terminating service with a current provider. The problem of cellular churn prediction thus includes both identifying and targeting retention efforts at customers having a high propensity, in the short term, of terminating cellular service with their current provider. Once data reflecting the problem has been collected, it is fed into a data mining algorithm for translation into a model.

Tables 1 and 2, below, illustrate some of the capabilities of the model manipulation system applied to a set of decision rules. In the examples, some attribute names are prefixed with "T1_" to indicate the attribute's value during the previous month, and by "T2_" to indicate the value of the attribute two months ago.

Table 1 shows an example where an analyst achieves data understanding with respect to the churn behavior of DNP-RECONN customers, i.e., customers that had service disconnected due to the nonpayment of bills, and were recently reconnected.

TABLE 1

| Rule Manipulation | Rule after manipulation | Rule quality | | Observations |
| --- | --- | --- | --- | --- |
| Original Rule | MTH_SRVC > 10<br>T2_CNCL_RSN_ABBREV = DNP-RECONN<br>T1_TOTAL_CALLS > 0<br>T1_BALANCE_FWD > 44.25<br>→ churn | coverage<br>concentration<br>Lift<br>Payoff | 0.39% (321)<br>1.57% (38)<br>4.0<br>6218.12 | Rule generated by Rule Quest Research's C5.0 for a specific market. Rule quality measures computed for the entire historical dataset. |
| Delete condition<br>T2_CONCL_RSN_ABBREV = DNP-RECONN | MTH_SRVC > 10<br>T1_TOTAL_CALLS > 0<br>T1_BALANCE_FWD > 44.25<br>→ churn | coverage<br>concentration<br>Lift<br>Payoff | 13.58% (11210)<br>24.13% (587)<br>1.8<br>−7692.64 | T2_CNCL_RSN_ABBREV = DNP-RECONN specifies customers whose service had been cancelled two months ago due to non-payment and has been reinstated. When this condition is deleted, lift and payoff drop significantly indicating that this condition is important for good performance of the rule. Thus, DNP-RECONN customers who make new calls, and are not paying their bills fully (positive BALANCE_FWD) are more likely to churn. |

TABLE 1-continued

| Rule Manipulation | Rule after manipulation | Rule quality | | Observations |
|---|---|---|---|---|
| Increase TOTAL_CALLS and BALANCE_FWD | MTH_SRVC > 10<br>T2_CNCL_RSN_ABBREV = DNP-RECONN<br>T1_TOTAL_CALLS > 10<br>T1_BALANCE_FWD > 100<br>→ churn | coverage<br>concentration<br>Lift<br>Payoff | 0.13%<br>0.99%<br>7.8<br>6528.18 | (105) The lift increases significantly, (24) while coverage drops a little. Thus, the more calls DNP-RECONN customers make, and the higher their BALANCE_FWD, the more likely they are to churn. |

The first column illustrates manipulations made to a rule by a user of the model manipulation system. The second column of Table 1 illustrates decision rules either generated by a data mining tool, such as C.50 by RuleQuest Research, discussed above, or such a rule after manipulation by the user. The third column illustrates a default set of business metrics computed by the model manipulation system. The fourth column illustrates observations made by a user of the model manipulation system. These observations reflect a user's analysis of a particular rule and the computed business metrics.

The business metrics computed by the model manipulation system in this example include: coverage, lift, concentration, and payoff. Coverage indicates the number of records in a dataset to which a rule applies; coverage is computed as the number of customers satisfying a rule (i.e., satisfying the antecedent conditions of the rule) divided by the total number of customers, multiplied by 100. Concentration reflects an assessment of the accuracy, or confidence of a rule; concentration is computed as the number of churners satisfying a rule divided by the number of customers satisfying a rule, multiplied by 100. Lift reflects another measure of rule accuracy; calculated as concentration divided by churn rate. Payoff not only takes into consideration the coverage and concentration of a rule, but also incorporates the business model; payoff for a customer is computed as the probability of a customer accepting a promotional offer (and hence not churning) multiplied by the average revenue associated with that customer less the costs incurred in contacting the customer and fulfilling the promotional offer. Based on historical data, if a customer did not churn, the promotional offer incurs a cost with no benefit, and payoff is then negative (and equal to cost). Payoff for a rule is computed by summing the payoff for all customers satisfying the rule. As indicated above, a user of the model manipulation system may compute additional business metrics or rule quality measures as desired.

Row 1 displays an original rule presented to a user via the model manipulation system's interface. Row 2 displays the original rule after modification by a user. By deleting the condition "T2_CNCL_RSN_ABBREV=DNP-RECONN," coverage increases from 0.39% to 13.58%, churn captured increases from 1.57% to 24.13%, lift decreases from 4% to 1.8%, and payoff decreases from 6218.12 to (−)7692.64. Based on this data an analyst may conclude, among other things, that DNP-RECONN customers who make new calls, and are not paying their bills in full and on time, are more likely to churn.

TABLE 2

| Rule Manipulation | Rule after manipulation | Rule quality | | Observations |
|---|---|---|---|---|
| Original Rule | MTH_SRVC <= 10<br>T1_BALANCE_FWD > 69.468<br>T1_DETAIL_BILL_FLG = N<br>T1_THREE_MOS_AVG_PROFIT > 0.7439998<br>→ churn | coverage<br>concentration<br>Lift<br>Payoff | 0.37% (307)<br>2.15% (52)<br>5.8<br>3831.23 | Rule generated by Rule Quest Research's C5.0 for a specific market. Rule quality measures computed for the entire historical dataset. |
| Change MTH_SRVC to be less than or equal to 13 | MTH_SRV <= 13<br>T1_BALANCE_FWD > 69.468<br>T1_DETAIL_BILL_FLG = N<br>T1_THREE_MOS_AVG_PROFIT > 0.7439998<br>→ churn | coverage<br>concentration<br>Lift<br>Payoff | 0.40%(330)<br>2.31%(56)<br>5.8<br>4837.61 | Increasing MTH_SRVC (i.e., tenure, or number of months customer has had service) to 13 captures more customers and increases payoff. |
| Change MTH_SRVC to be less than or equal to 14 | MTH_SRV <= 14<br>T1_BALANCE_FWD > 69.468<br>T1_DETAIL_BILL_FLG = N<br>T1_THREE_MOS_AVG_PROFIT > 0.7439998<br>→ churn | coverage<br>concentration<br>Lift<br>Payoff | 0.41%(336)<br>2.31%(56)<br>5.7<br>4777.29 | Further increasing MTH_SRVC to 14 results in a drop in payoff. MTH_SRVC <= 13 has "optimal" payoff. |
| Delete DETAIL_BILL_FLG = N | MTH_SRV <= 14<br>T1_BALANCE_FWD > 69.468<br>T1_THREE_MOS_AVG_PROFIT > 0.7439998<br>→ churn | coverage<br>concentration<br>Lift<br>Payoff | 2.41%(1987)<br>10.83%(263)<br>4.5<br>26039.58 | Coverage, churn captured, and payoff increase dramatically, while lift drops to 4.5. |
| Change MTH_SRVC back to 13 | MTH_SRV <= 13<br>T1_BALANCE_FWD > 69.468<br>T1_THREE_MOS_AVG_PROFIT > 0.7439998<br>→ churn | coverage<br>concentration<br>Lift<br>Payoff | 2.22%(1832)<br>10.17%(247)<br>4.6<br>24841.77 | Payoff drops indicating that it is "optimal" when MTH_SRVC <= 14 (unlike when DETAIL_BILL_FLG was included). |

Table 2 illustrates an example of an analyst varying rule parameters to optimize payoff.

Row 1 of Table 2 displays an original rule as seen by a user. Row 2 displays the user manipulations to the original rule. In this case, the user changed the MTH_SRVC (months of service) parameter from less than or equal to 10 to less than or equal to 13. This change increased the number of records included in the dataset from 0.37% to 0.40%, increased the churn concentration from 2.15% to 2.31%, and increased payoff from $3831.23 to $4837.61. Rows 3, 4, and 5 of Table 2 illustrate additional user manipulations to rules, the impact of the manipulations on the business metric computations, and potential observations that may guide a user to gaining insight into the data reflected by the original rule, presented in row 1 of Table 2.

To validate an intuition, an analyst may simply type a rule into the model manipulation interface and analyze the computed business metrics. Referring back to row 3 of Table 1, an analyst may determine, based on the lift value of 7.8, that the more calls DNP-RECONN customers make, and the higher their forwarding balance, the more likely they are to churn. In fact, such customers churn at a rate that is 7.8 times higher than the churn rate of an average customer (see lift value of Table 1, row 3). Although this rule was the result of an analyst's manipulation of a generated rule, an analyst could have typed the rule in and received the same information.

CONCLUSION

By providing an interactive interface that allows a user to manipulate decision rules that represent a set of data, the model manipulation system supports directed data analysis, which yields directed data understanding. The model manipulation system provides an interface that is flexible enough to allow a user to create a rule set, modify an existing rule set, or use an existing rule set as-is. The system guides the user through the analysis process by computing measures of quality each time a rule changes. The web-based graphical interface is both efficient and user friendly, thereby allowing any data analyst to easily use the system.

While the present invention has been described in connection with a preferred embodiment, many modifications will be readily apparent to those skilled in the art, and this application is intended to cover any adaptations or variations thereof. This invention should be limited only by the appended claims and equivalents thereof.

What is claimed is:

1. A graphical user interface, including:
   a market segmentation interface that displays decision rules representing relationships among elements of a dataset; and
   a rule manipulation window for displaying computed business metric values associated with the displayed decision rules, allowing manipulation of the displayed decision rules, and displaying recomputed business metric values associated with manipulated decision rules.

2. The graphical user interface of claim 1, wherein the rule manipulation window permits an analyst to perform directed data analysis in the field of cellular churn prediction.

3. The graphical user interface of claim 1, further including a display window for displaying the results of computations associated with a displayed rule.

4. The graphical user interface of claim 1, wherein the market segmentation interface further includes an area that allows a user to select a market associated with a displayed rule.

5. The graphical user interface of claim 1, wherein the market segmentation interface further includes an area that allows a user to select a beginning date and an ending date represented by a rule set.

6. The graphical user interface of claim 1, wherein the market segmentation interface further includes an area that allows a user to filter a rule set based on specific fields.

7. The graphical user interface of claim 1, wherein the market segmentation interface further includes an area that allows a user to sort a rule within a rule set based on sort criteria.

8. The graphical user interface of claim 1, wherein the manipulation window includes means for displaying a rule.

9. The graphical user interface of claim 1, wherein the rule manipulation window further includes a hypertext link to additional information about a displayed rule.

10. The graphical user interface of claim 1, wherein the market segmentation interface displays the rules by displaying at least one condition, at least one prediction, and an estimate as to the accuracy of the at least one prediction.

* * * * *